United States Patent Office 3,822,192
Patented July 2, 1974

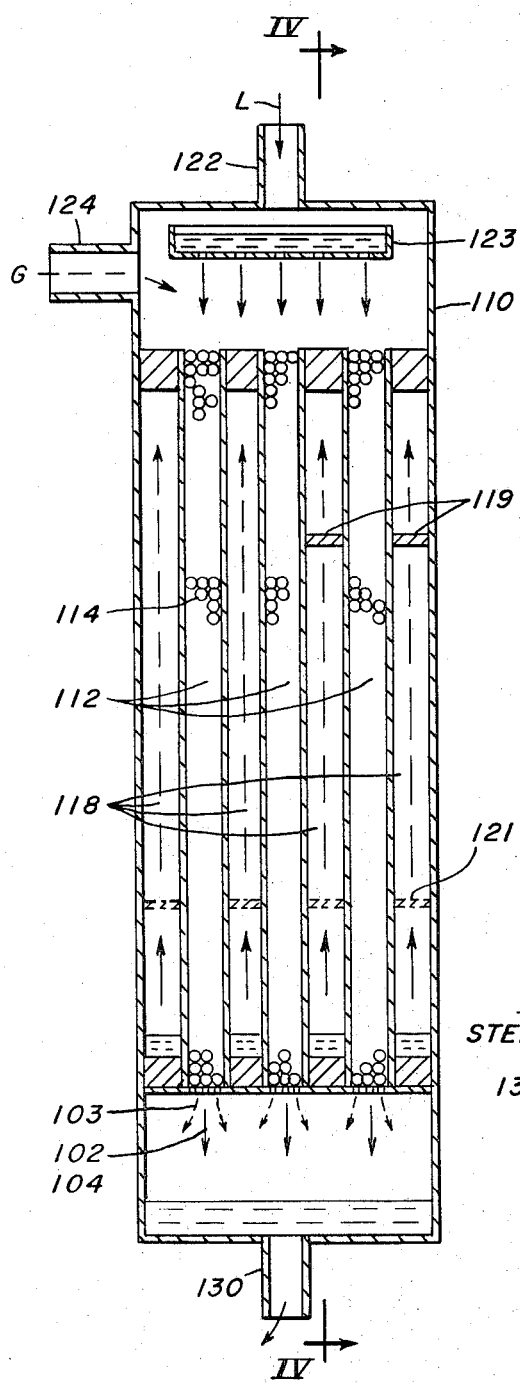
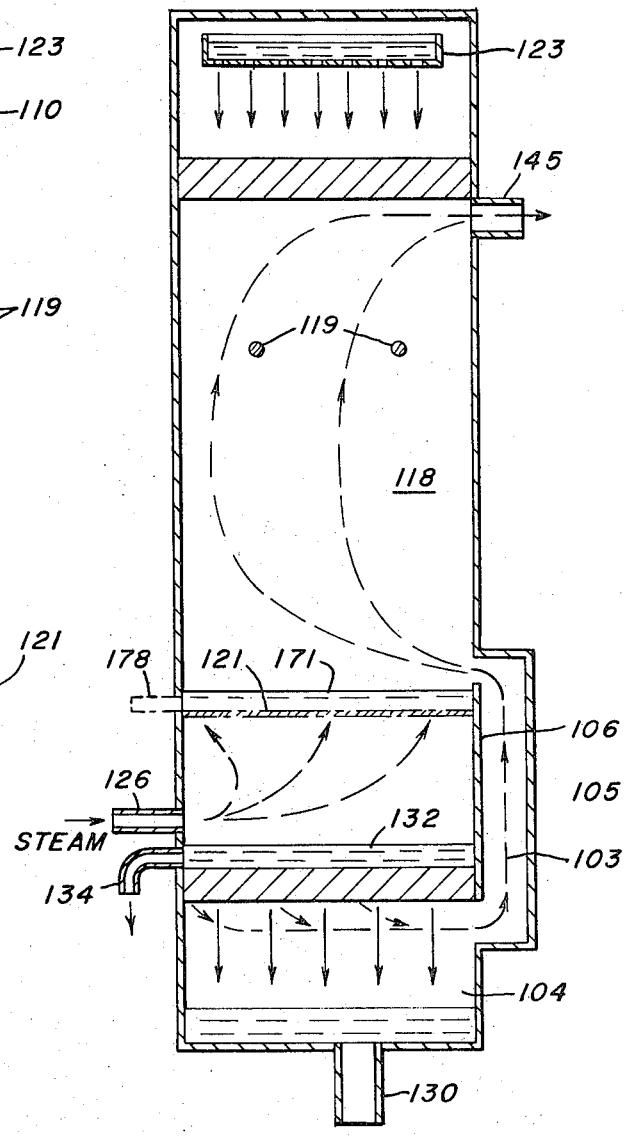

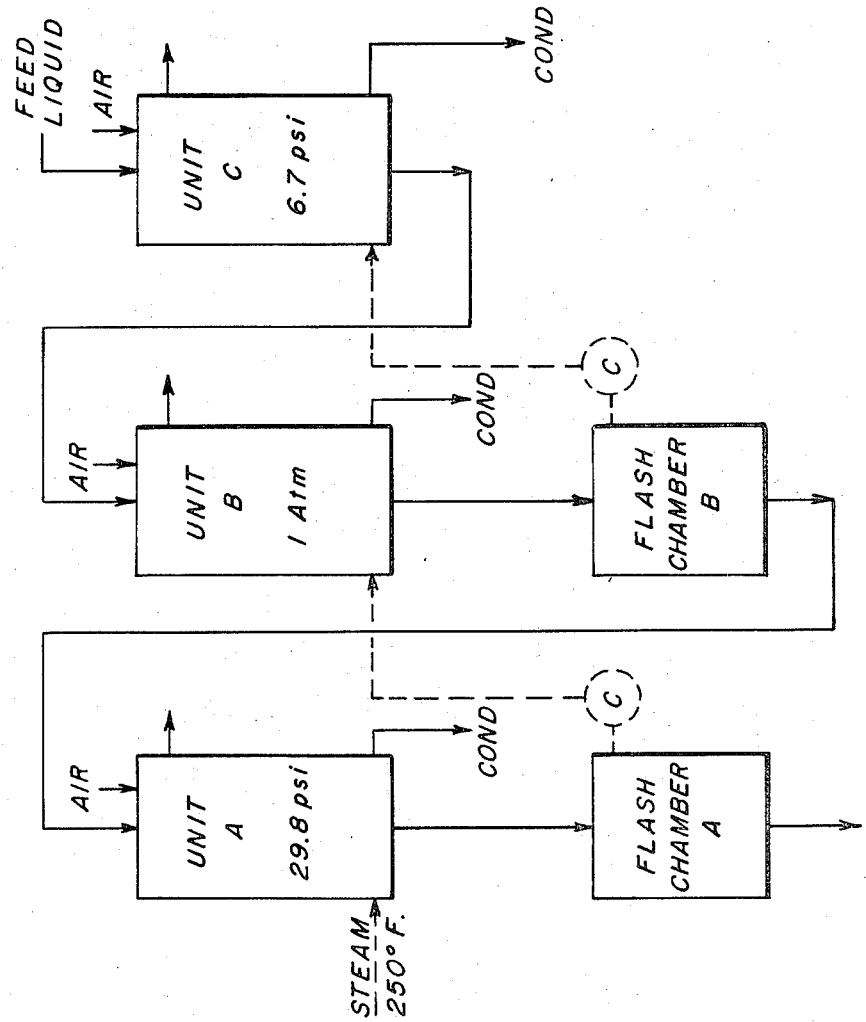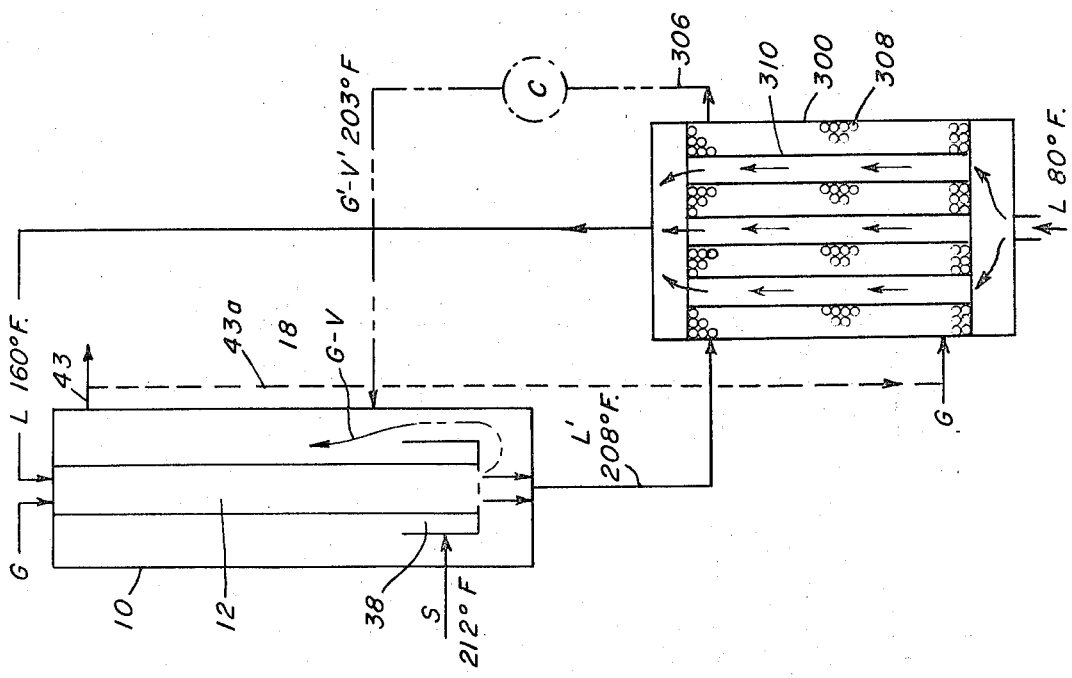

3,822,192
EVAPORATIVE METHOD
Melvin H. Brown, Leechburg, Pa., assignor to Aluminum Company of America, Pittsburgh, Pa.
Filed Dec. 8, 1971, Ser. No. 206,086
Int. Cl. B01d 1/06, 1/10, 1/14
U.S. Cl. 203—49                                    25 Claims

ABSTRACT OF THE DISCLOSURE

The method of evaporation featuring humidification is effected in a chamber maintained at a downwardly increasing temperature gradient. The liquid being treated and a vapor carrier gas are passed downwardly through the chamber where the carrier gas is enriched in vapor from the liquid. The enriched carrier gas exiting from the bottom of the chamber is moved upwardly alongside the chamber and in heat transfer relation with the fluids within the chamber. Heat is applied to the bottom portions of the chamber to assure the desired temperature gradient. Condensation occurs on the outside of the chamber. This condensate and the concentrated liquid can be recovered. The heated liquid concentrate exiting the bottom of the chamber may be further treated.

BACKGROUND OF THE INVENTION

There are numerous processes for the evaporation of a liquid in order to concentrate its non-volatile components or to recover purified volatile components or both. Most of the more popular schemes feature evaporation and condensation somewhere in the system. Many of these processes are marked by complexities which raise the initial cost of the system often beyond practicality or involve extensive operating costs or, at an acceptable cost level, insufficient phase separation.

DESCRIPTION

In the description, reference is made to the figures in which:

FIG. 3 is a schematic elevation depicting a multiple element embodiment of the invention;

FIG. 4 is a schematic elevation taken along lines IV—IV in FIG. 3;

FIG. 6 is a schematic illustrating the invention in multiple stage arrangement;

FIG. 8 is a schematic illustrating the invention in another multiple stage arrangement.

STATEMENT OF THE INVENTION

In accordance with the present improvement a liquid containing a volatile component which may be water is passed downwardly in a descending film fashion through an evaporation chamber or column containing a pack or the like to provide multiplicities of film supporting surfaces. Concurrently with the liquid there is passed a stream of a carrier gas selected to transport vapor from the volatile liquid. A downwardly increasing temperature gradient is maintained within the column largely by action of heat which is applied to the lower portions of the column. As the gas and liquid media move down the column vapor transfer from the liquid to the carrier gas occurs along with, and largely as a result of, a heating of both media. The carrier gas enriched with vapor exits the bottom of the column and is moved upwardly along a wall of the column and in heat transfer relation with the fluids descending within the column. This effects heating of the fluids inside the column to help maintain the downward increasing temperature therein and also effects condensation of vapor from the carrier gas-vapor mixture. The condensed vapor can be recovered as a purified fraction of the corresponding liquid. Additional vapor can be condensed from the carrier gas-vapor mixture after it has been passed upwardly along the length of the column wall.

DETAILED DESCRIPTION

While not necessarily intending that the invention be restricted to a process of purifying water the method is suitably described with respect thereto. The water referred to includes saline water which term is used in the popular sense rather than a strict literal sense. Saline water as used here refers to river or other surface water, well water, or the like containing typically 100 parts or more per million dissolved solids, the so-called brackish waters containing typically 10,000 p.p.m. dissolved solids, sea water containing typically 35,000 p.p.m. dissolved solids or any water containing up to around 75,000 p.p.m. dissolved solids. The saline water referred to includes in a still broader sense any waste or other water containing solids up to the limit of solubility and capable of purification by condensation of evaporated vapors to produce potable or even more highly purified grades of water. Thus the improvement represents a valuable contribution insofar as water treatment is concerned in that it not only produces purified water but concentrates waste streams thereby greatly reducing their volume to simplify and reduce waste disposal problems.

Figure 1:
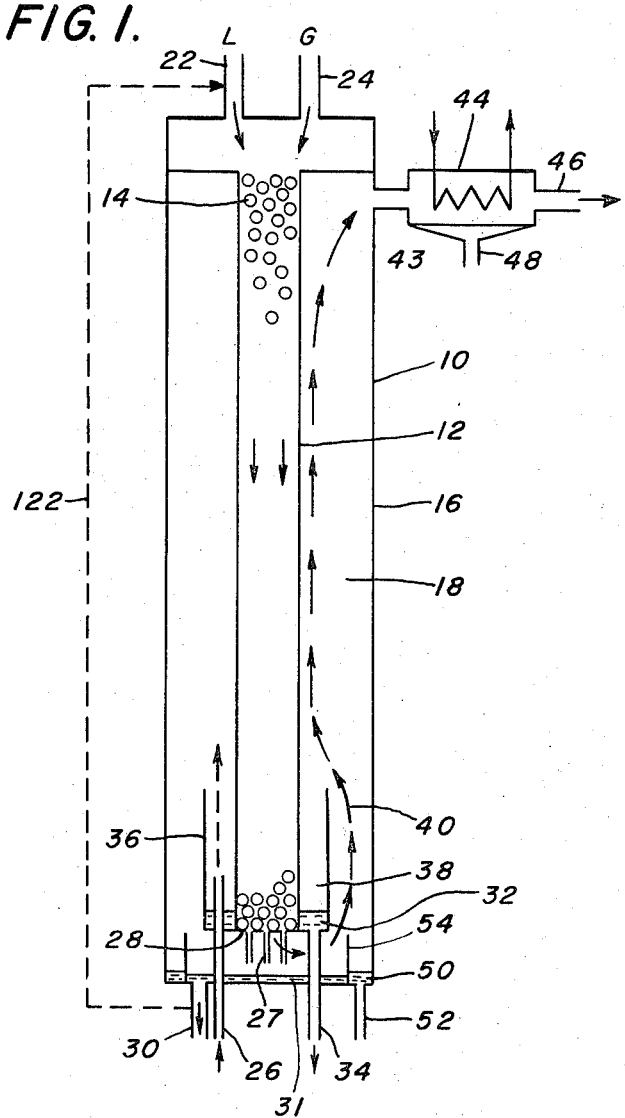
FIG. 1 is a schematic elevation illustrating the operation of the invention in one embodiment.

Referring to FIG. 1 there is shown an arrangement for carrying out the improved method suitable in a process for purifying water. In the figure, system 10 includes a substantially vertical inside evaporation column or chamber 12 filled with packing 14. The arrangement also features an outer chamber 16 such that the concentric arrangement of chambers 12 and 16 provides an annular space, condensation chamber 18, around inner chamber 12. Saline water enters the system through inlet 22 and air enters through gas connection 24 under a slight pressure provided by a blower, not shown.

Both air and water media descend within column 12, the water moving downwardly in descending film fashion over the packing 14. Steam enters through connection 26 to heat the lowermost portions of chamber 12. As the incoming water and air descend through column 12 they are heated so as to promote evaporation from the saline water liquid into the air which is thus humidified or enriched in water vapor. The unevaporated heated water concentrate 27 drops from the bottom 28 of chamber 12 and forms a pool 31 which exits through heated liquid concentrate discharge 30. The water vapor enriched air exits the bottom 28 of the chamber 12 and moves upwardly through annular condensation chamber 18 between the chambers 12 and 16 as indicated by arrows 40. As the vapor enriched air moves upwardly through the condensation chamber 18 it contacts and exchanges heat through the wall of chamber 12 and thus heats the gas-liquid media in the cooler upper portions within the chamber 12. This effects a cooling of and condensation from the gas-vapor mixture on the outside wall of chamber 12. The condensate descends the wall and is collected as a pool 32 around the bottom of the column 12. The pool is drained through connection 34 and is recovered as a purified water product. A baffle 36 provides a second annular space 38 around the bottom portions of column 12. It is within this annular space 38 that condensate pool 32 is confined. Into this annular space 38 is introduced the previously mentioned steam through connection 26 to transfer heat to the bottommost portions of the column 12 and heat these portions to a high level. This, along with the heat from the carrier gas-vapor mixture provide and maintain the desired downwardly increasing temperature within the column 12. Baffle 36 serves the additional function of preventing the gas-vapor mixture designated by arrows 40 from contacting the bottommost portions of the column 12 directing them instead to portions above those most influenced by the steam input through connection 26. That is, baffle 36 enables the gas-vapor mixture to bypass the bottommost portions of the column thus avoiding substantial mixing of the hot stream and the cooler gas-vapor mixture. This enables the hot steam introduced through nozzle 26 to heat the bottommost portion of the column 12 to the highest practical temperature and enables the cooler gas-vapor mixture to heat higher portions of the column 12 and the gas-liquid media therein. Thus some means such as baffle 36 is advantageously provided to direct the carrier gas-vapor mixture to bypass the bottommost portions of the column to best facilitate maintaining the desired downward increasing temperature condition. However, on a less preferred basis, the invention contemplates mixing the carrier gas-vapor mixture with the entering steam since the gradient can still be maintained but with decreased control and efficiency.

After moving upwardly along the outside length of column 12 through annular condensation chamber 18 the gas-vapor mixture exits the condensation chamber 18 through outlet 43 and may be passed through a heat exchanger 44 which condenses most of the remaining vapor from the stream which then exits through connection 46. Additional condensate is removed from the heat exchanger through condensate recovery line 48. In the embodiment shown in FIG. 1 it is possible that additional condensation along the inside wall of outer chamber 16 may occur. This condensate would descend the inside wall of chamber 16 and be collected as a pool 50 which is removed through line 52 as an additional condensate product stream. Baffle 54 separates the condensate pool 50 from the unevaporated water discharge pool 31. It is preferable, however, to thermally insulate the outer wall of chamber 16 to minimize heat loss to the atmosphere and improve overall efficiency which, in turn reduces any condensation on that wall.

In systems of the type just described it has been possible to recover as much as five pounds of condensate product for each one pound of steam supplied to the system. This, itself, is considered quite competitive with recovery ratios of 3–20 to 1 normally associated with conventional multi-stage flash distillation systems widely employed in the purification of saline water. The advantage of the improved system is its very low initial cost and simplicity which drastically reduce costs in comparison with such multi-stage flash systems. Further, as explained hereinbelow, the improved system is capable of combinations with existing conventional multi-stage flash systems to provide substantially improved efficiencies at minimal cost or capital investment.

Figure 2:
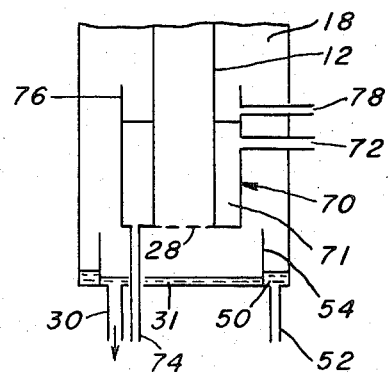
FIG. 2 is a fractional view showing the lower portion of FIG. 1 modified to suit another embodiment of the invention.

Concerning suitable liquid feeds, as indicated earlier the improved method is particularly suited to the purification of water such as saline water, but should find application to other liquids. Some of the liquids may be liquid-solvent systems containing a dissolved non-volatile substance such as dissolved solids. Such a solvent system, of course, includes sea water and other brackish or saline waters and many chemical or waste waters. In a broader sense the invention contemplates treating a liquid at least a portion or fraction of which is volatile. In the case of water or other solvent systems, the entire solvent may be considered volatile. However, in the case of a mixture of alcohol and water the alcohol is the more volatile liquid which can be evaporated, condensed and recovered in accordance with the improvement which results in producing an alcohol enriched stream and a water enriched stream. Of course, the concentrated water can be recovered as a useful product. In the treatment of the water-alcohol system, which may be water and methanol, the liquid is introduced along with air or other gas and the streams are passed downwardly through column 12. The gas picks up methanol vapors and is passed upwardly along the outside of column 12 through condensation chamber 18 to exchange heat with the streams descending within the column 12. The necessary heat to the bottom of column 12 to assure the required downwardly increasing temperature gradient can be provided by indirect exchange as illustrated in FIG. 2 which is discussed in more detail hereinbelow. Obviously if steam were introduced here such could frustrate the purpose sought, the separation of water and methanol. The aspect of the heat source for the bottom of the column is discussed in more detail hereinbelow.

Other liquids which may be treated by the improved system include the treatment of the hexane-vegetable oil effluent from the extraction of soybean oil. These effluent streams contain typically about 80% hexane and 20% vegetable oil. The hexane is the more volatile phase and is selectively recovered as a condensate product. The vegetable oil is concentrated and exits through line 30. Similarly trichloroethylene is recovered as the volatile condensate product removed from oils and waxes in the effluent from degreasing operations in metal rolling mills and the like. Another system suitable for treatment by the improved method contemplates the separation of comparatively volatile mineral spirits from soaps, stearates and heavier mineral oils used in rolling mill lubricants.

Still other applications occur in the concentration of aqueous solutions where the purified water is of secondary importance to the concentration. For instance a sugar solution can be concentrated in order to enrich the sugar values in the solution exiting line 30 while recovering a water condensate product in puried form. Here, of course, both products may be valuable. Other applications of the improved method contemplate the treatment of industrial waste waters such as its sulfite effluent from paper mills, rinse water chemical effluents from metal treating or plating processes and any of the many effluents from industrial plants. The improved method concentrates the waste stream thereby greatly reducing its volume thus facilitating its further treatment, including chemical recovery where desired. Of course, a purified water or other condensate product can also be recovered. Still other applications contemplate the removal of very small amounts of gas impurities such as ammonia, hydrogen sulfide or sulfur dioxide from water solutions by heating and partial water evaporation. Most of the gas impurity would exit with the carrier gas. Both the liquid "concentrate" (line 30 in FIG. 1) and the condensate (line 34 in FIG. 1) are purified with respect to the gas.

Concerning suitable gas feed, in many embodiments of the invention the most convenient gas is air since it is so readily available at substantially no cost. However, other gases such as the inert gases, $CO_2$ or the like can also be employed where they offer advantages in a particular system. Where a gas is valuable or costly it can be recycled. That is, referring to FIG. 1, the non-condensed gas leaving condenser 44 through exit line 46 can be treated or purified, if necessary, and returned by pumping it through suitable pumping means, not shown, into the gas inlet 24 to the column 12. In the case of purifying sea water it may be advantageous to use nitrogen in some situations since sea water is less corrosive to some metals when not aerated, i.e. not enriched with oxygen. Hence the invention contemplates the use of carrier gas comprising nitrogen in purifying sea water. Where not objectionable that gas can be air. The main function of the gas is to carry vapor formed in the column 12 so as to facilitate its movement therefrom and upwardly along the exterior of the column or chamber. Hence the terms "vapor carrier gas" or "carrier gas" are intended to encompass any gas suitable for that purpose. In many embodiments this gas is suitably nonreactive with the vapor formed, or the liquid or any constitutent thereof which are treated within the column 12. However, such is not absolutely necessary in practicing the invention as the vapor carrier gas may include constituents which react in a beneficial way with either the liquid or the vapor. An example occurs where sewage serves as the liquid entering the column. Here using air as the vapor carrier gas serves to aerate the liquid moving down the column thereby beneficiating the unevaporated liquid. The vapor carrier gas may be saturated or unsaturated with respect to the vapor to be carried. Obviously, if it is relatively dry with respect to the vapor it can carry more of the vapor but such is not absolutely necessary since the gas is heated as it moves down through column 12. This promotes the humidification of the gas by the vapor of the volatile liquid moving down the column with the gas.

Concerning heat input to the bottom of column 12, the embodiment shown in FIG. 1 shows heated vapor (i.e., vapor high enough in temperature to serve as a heat source) of substantially the same composition as the condensable vapor removed from the incoming liquid being employed as the heating means for the bottom of column 12. The heated vapor (itself condensable) in condensing provides additional desired condensate product. In the distillation of sea water, however, other heated vapor, condensable or not under the particular operating conditions, could be employed as the heat source. Of course, such heated vapors should be selected as would minimize undesirable contamination of the condensate product stream. One suitable choice might be the condensable vapor of a liquid which is immiscible with water such as certain organic liquids. These involve no contamination since the organic liquid is readily separated from the condensate water product. Where desired the necessary heat might be provided by the condensable vapor of a liquid which mixes with the condensate product but not in an objectionable manner. For instance, it might be desired to have as a condensate product a mixture of the volatile liquid removed from the liquid input to column 12 along with another liquid.

So far, the heat input to the bottom portions of column 12 has been described in terms of condensable vapors whose condensation product is co-mingled with the condensate derived from the evaporation within the column 12 being either easily separated therefrom or forming a desired, or at least non-objectionable, mixture therewith. However, other arrangements in accordance with the invention contemplate the use of any heating means. For instance, referring to FIG. 2 the bottom portion of the column 12 is encased in a jacket 70 to provide a heating chamber 71 which is isolated from annular condensation chamber 18. This permits the introduction of a condensable vapor in inlet 27, condensation and heat exchange separate from the condensation from the vapor carrier gas in the condensation chamber and removal of condensate for the separate heating chamber 71 through outlet 74. In this arrangement baffle means 76 is provided to prevent the condensate formed on the walls of column 12 in chamber 18 from falling into unevaporated liquid pool 31 below the outlet of column 12. Condensate product removal nozzle 78 then facilitates removal of the condensate product. The isolation of heating chamber 71 from the fluids within column 12 and annular space 18 permits the use of heating media which is incompatible with the liquid or carrier gas entering the upper portion of column 12. For instance flue gas or other hot waste gases or even hot liquids such as hot oil can be employed. Similarly electrical or even fired heating means are suitable to heat the bottom of the column 12. All that is necessary is that the heating means be sufficient to provide a suitable temperature at the bottom portions of column 12, which temperature is generally the highest in the column so as to provide the downwardly increasing temperature gradient required in the practice of the invention. By heating the bottommost portions of the column is meant that heat is applied to only the lowermost 1/3 or preferably the lowermost 1/4 or 1/5 or less of the column height. For instance, in a column 12 feet high heat is suitably applied only to the bottom 18 inches. That is, referring to FIGS. 1 and 2, respectively, baffle 36 and jacket 70 extend only 18 inches.

The heat applied must be heat external to the heat contents of the fluids descending within the column. That is, simply preheating the inlet streams, while contemplated by the invention, does not obviate the necessity that the bottom portion of the column be heated independently. The heat applied to the bottom portions of the column together with condensation which occurs in condensing chamber, annular space 18 in FIG. 1, combined to produce the desired downwardly increasing temperature gradient through the column. Thus progressively higher temperatures prevail in the column as measured proceeding downwardly. These steadily downwardly increasing temperature levels in the column provide for continuous heating of the fluids descending within the column to progressively higher temperatures as the streams travel downwardly through the column.

It is noteworthy that the present improvement is operable at temperatures associated with low pressure steam in many embodiments and thus enables the utilization of low cost steam for a useful purpose such as purifying water. Also, other types of low cost energy such as waste heat can be employed in practicing the invention. For instance, escaping stack gases can readily be employed to generate low pressure steam which can serve as the heat input to the bottom of the column 12 in FIG. 1.

Concerning the temperatures of the respective streams entering the system reference is again made to FIG. 1 and the illustrative example of the embodiment of the invention applicable to the purification of saline water or sea water. It is preferable that the temperature of the steam entering through steam inlet 26 exceed the temperatures of both the liquid and the gas entering the top of column 12 through inlets 22 and 24. It is also preferable that the gas entering the system be at a relatively cool temperature such as room temperature. The main limit on the temperature of the carrier gas entering the system, of course, is that it not be so high as to eliminate or excessively deter the desired downwardly increasing temperature gradient.

As indicated above it is preferred that, referring again to the sea water example, the temperature of the steam entering through line 26 exceed that of either liquid or gas entering the top of column 12. However, within some limits, this is not absolutely necessary. For instance assuming that the temperature of the steam is about 200° F., the liquid temperature could be 210° F. without necessarily upsetting the necessary downward temperature gradient. The required temperature gradient could be provided by using considerable quantities of air at 70° F. The mixed fluids enter the top of column 12 at a temperature somewhat less than the 210° F. temperature of the liquid and even less than the 200° temperature of the steam. It is even possible that the temperature of the air could be 200° or 210° in this illustration since maintaining suitable pressure conditions within column 12 can prompt sufficient evaporation within the very topmost portions of column 12 such that the temperature of the air-water fluid media is quickly lowered to a level substantially below the 200° temperature of the steam entering line 26. Thus flash evaporative effects at the top of the column or chamber 12 can be used in cooperation with the temperature of the steam heat source entering line 26 to assure the desired downward increasing temperature gradient.

Figure 1A:
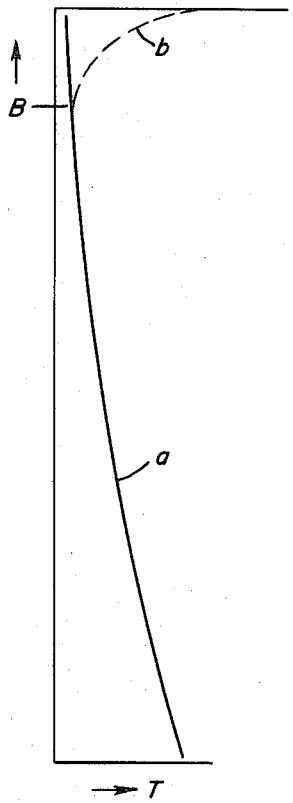
FIG. 1A is a depiction of the temperature profile along the length of the column of FIG. 1.

The temperature effects along the length of the column 12 are illustrated schematically in FIG. 1a where it can be seen as shown by curve "a" that under normal and generally preferred operating conditions the temperature gradually and steadily increases along the length of column 12 proceeding in a downwardly direction. However, where the temperature conditions are similiar to those just discussed in the preceding paragraph the uppermost portion of column 12 exhibits a temperature profile of the type typified by curve "b" which illustrates the effects of flash evaporation cooldown. Thus, in a sense, the top or uppermost portions of the column indicated in FIG. 1a as above line B can be considered something of a cooling tower or flash evaporation chamber which could even be enclosed in a separate vessel external to column 12 but is instead simply included in the uppermost portion of the column for simplicity of construction. That portion of the column corresponding to the length below line B is the portion where the desired downwardly increasing temperatures are maintained by the application of heat independent of that contained in the incoming streams and by the condensation which occurs on the outside walls of chamber 12 within condensation chamber 18. In any event the comparative lengths are similar to those illustrated in FIG. 1a in that any cooldown zone is relatively short (less than one-fifth typically) in comparison with the zone having the downwardly increasing temperature gradient within the column or chamber 12.

Concerning the extent of the downwardly increasing thermal gradient the best choice varies considerably from one application to another. Generally lower temperature gradients favor higher performance ratios insofar as pounds of condensate per pound of steam input are compared. On the other hand higher thermal gradients favor higher production rates with respect to the absolute quantity of condensate formed and a balance is generally struck according to the economics involved in the particular application or process.

Concerning operating pressure, as already suggested there is no special limit on the pressure within column 12 or annular space 18. The system can be operated at atmospheric pressure or at higher or lower levels. Low pressures can be employed to induce flash evaporative effects within the column 12 to further improve the rate of evaporation and vapor transfer to the carrier gas which occurs within the column or chamber 12. Similarly a higher than atmospheric pressure can be employed where the effects of such within annular space 18 or condenser 44 or any other region of the system are favorable to condensation or any other desired effect.

Concerning the respective flow rates of the carrier gas and liquid media entering the column 12 such are partially dependent on the respective temperature of the incoming, and especially the outgoing, liquid and carrier gas. Where the temperature of the outgoing or concentrated liquid is relatively high the amount of gas empolyed can be decreased since the carrier gas capacity to hold a vapor usually increases drastically with increasing gas temperatures and it is apreciated that the gas temperature would be increased to substantially the same level as the liquid temperature. On the other hand where the outgoing liquid temperature is relatively low gas flow should be increased since its capacity per unit volume to carry vapor will be reduced by the reduced temperatures. Considering operating conditions where the incoming liquid is at an elevated temperature higher amounts of relatively cool gas can augment the cooldown effect illustrated by curve "*b*" in FIG. 1*a*.

Turning now to the subject of the materials from which the arrangements depicted in FIG. 1 and the subsequent figures can be constructed, it is noteworthy that since the invention is operable under vacuum or pressure or atmospheric conditions the materials need only be strong enough to withstand the selected pressure. Where operating under atmospheric conditions relatively lightweight or thin members can be employed largely through the system. These materials need only be compatible with the fluids employed and the operating temperatures. Concerning the evaporation of sea water or other saline water lightweight aluminum or plastic or composite members are highly useful. Additional discussion on the relative weight or strength of the materials appears below in connection with arrangements of the type shown in FIGS. 3 and 4.

The improvement to this point has been described in its most simple and readily understood arrangements as illustrated in FIGS. 1 and 2. There are, however, other arrangements highly suited to improving the efficiences and the economies in practicing the invention. Referring now to FIG. 3, the system is housed in a vessel 110 which is of generally rectangular configuration and contains a number of alternating chambers separated by generally parallel sheet members 111 which define spaces for packed evaporation chambers 112 and alternating condensation chambers 118. Thus there are pluralities of evaporation and condensation chambers arranged in alternating heat exchange relationship. The evaporation chambers 112 correspond in function to column or chamber 12 in FIG. 1 and the condensation chambers 118 correspond to the annular space 18 in FIG. 1. Referring to FIG. 3 liquid enters through line 122 and is distributed across the upper portions of vessel 110 by distribution plate 123. Gas enters through line 124 and joins the liquid streams to descend within evaporation chambers 112 which are filled with packing 114 or other suitable means to facilitate descending film attitude in the liquid. The liquid and gas descend the evaporation chambers 112 and form streams of unevaporated liquid 102 together with vapor-carrier gas streams 103. These streams enter separation chamber 104 situated below the evaporation and condensation chambers 112 and 118. Referring to FIG. 4 it can be seen that the unevaporated liquid, as it drops vertically, separates from the carrier gas-vapor streams 103 traveling substantially horizontally within chamber 104. The carrier gas-vapor streams 103 move upwardly through bypass chamber 105 and into condensation spaces 118 wherethrough the streams move upwardly and in heat transfer relationship with the plates or sheets 111 separating each space 118 from its adjoining evaporation chambers 112. Thus the vapor moving upwardly through condensation chamber 118 moves in heat transfer relationship with the down flowing liquid-gas films and streams within evaporation chambers 112 to exchange heat therewith and effect condensation from the vapors within chambers 118 along with a commensurate heating of the contents descending within chambers 112. The uncondensed vapor and the carrier gas exit the chambers 118 through lines 145 which may be connected to a further condensing means, not shown, similar to condenser 44 in FIG. 1. Referring again to FIG. 4 there is introduced into the bottommost portions of condensation chambers 118 a supply of steam through steam inlet 126. This steam serves to heat the bottommost portions of evaporation chambers 112 to provide the necessary heat thereto to facilitate the required downwardly increasing temperature gradient within the chambers 112. The purpose for bypass 105 is to avoid immediate commingling of the vapor-carrier gas streams 103 with the steam entering through nozzle 126 which might occur otherwise. This avoids cooling the steam thus facilitating maximum heat to the bottom portions of evaporation chambers 112. Thus sheet member 106 provides a baffle which separates the vapor-carrier gas streams 103 from immediate contact with the steam entering through inlet 126. Condensation occurring on the sheets 111 in condensation chambers 118 is collected in a pool 132 and exits through connection 134. The arrangement depicted in FIGS. 3 and 4 offers the advantage of multiplicities of chambers analogous in function to column 12 and annular space 18 in FIG. 1 in an arrangement which is easily and economically constructed. Typically the spacing between adjacent sheets 111 might be around one-quarter to one or two inches or a little more and the sheets can be rather thin needing only sufficient strength to contain packing 114 within chambers 112. This support can be augmented by spacers 119 across the spacing of the condensation chambers 118 which further aid the sheets 111 structurally in containing the packing. Thus only the outermost walls need be constructed of relatively strong or thicker materials to provide structural integrity for the unit and resist forces caused by differences between atmospheric and operating pressure.

If desired the heating portion at the bottom of chamber 118 can be closed as by sealing member 121 which provides a closed chamber 170 analogous to chamber 70 in FIG. 2 and employing outlet 134 as an exit for the heating media which may itself be a condensate such as where steam is employed for heating. In such event a condensate product removal means analogous to baffle 76 and discharge 78 in FIG. 2 would have to be provided to facilitate recovery of the condensate product formed within condensation chambers 118. Thus condensate outlet 178 can be provided to exit the condensate 171 retained on seal member 121 by the extension of bypass baffle 106 above member 121.

The packing shown in FIGS. 1 through 4 can be any of the type normally employed in packed columns. It may be aggregate such as small stones or rocks or commercial packing such as Berl saddles, Rashig rings, glass wool, plastic waste (chips, turnings, etc.) or the like. Also suitable would be pluralities of vertically disposed sheet or foil members with or without corrugations, perforations or expanded features. In some cases the packing can even be dispensed with and reliance placed upon the films descending along the vertical heat exchange surfaces. All that is essential is that some means of film supporting surfaces be provided to keep the liquid moving through the evaporation chamber in descending films to facilitate contact with the carrier gas which permits the gas to pick up and transport vapors given off by the liquid. Where desired the packing can be active so as to treat the media descending within the column to beneficiate the liquid or vapor streams, or both, exiting the column. For instance activated charcoal or alumina could be useful in this respect.

Figure 5:
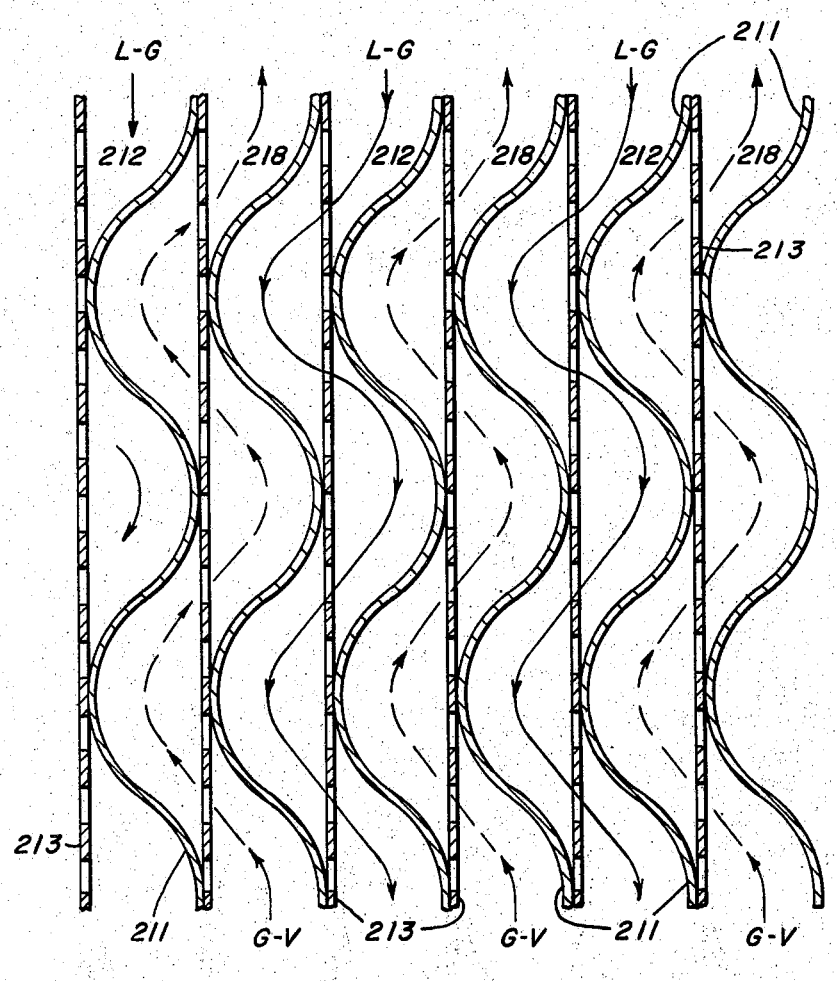
FIG. 5 is a schematic elevation depicting yet another embodiment of the invention.

One example of an arrangement without particulate packing appears in FIG. 5 which illustrates pluralities of corrugated sheets 211 and perforated sheet spacers 213. The spacers 213, of course, serve to maintain proper distance between neighboring sheets 211 without interfering with the flow of gases and vapors through the spaces between sheets 211. Similar to the system shown in FIGS. 3 and 4 alternate spaces between sheets 211 serve as evaporative zones 212 and condensation chambers 218. These are substantially identical in function to evaporation chambers 112 in FIG. 3 and column 12 in FIG. 1 wherethrough liquid and gas, L-G, are moved downwardly for purposes of evaporation and to condensation chambers 118 in FIG. 3 and annular space 18 in FIG. 1 wherethrough the vapor and carrier gas, V-G, are moved upwardly to effect condensation from the vapors. Here again a rather inexpensive but highly efficient means is provided to effect evaporation from the liquid and condensation of the vapor which condensate is recovered as condensate product. Similarly the arrangement in FIG. 5 could be replaced with alternating flat and dimpled or expanded sheet members. Various arrangements can be employed to provide the evaporation chambers and condensation chambers in accordance with the invention and the arrangements depicted are intended to be illustrative in a schematic sense and not necessarily limiting with respect to the practice of the invention.

If desired, the concentrated and unevaporated liquid exiting the bottom portion of the evaporation chambers can be processed further to effect further concentration thereof or further recovery of volatile liquid therefrom. For instance, referring to FIG. 1 the unevaporated liquid concentrate exiting through outlet 30 can be subjected to flash evaporation. In typical trials involving the evaporation of sea water the concentrated liquid exits outlet 30 at temperatures in excess of 170° F. This provides an excellent heated feed for flash evaporation processes which suitably may be of the type shown in my patent, U.S. Pat. 3,528,890. Of course, other evaporation systems may also be employed where desired. The improved system can be substituted for the brine heater after the hottest liquid stage in a conventional multi-stage flash system to substantially improve the performance ratio with minimal capital cost thus achieving increased processing and product economies. Performance ratio improvements of up to 50% or even higher are feasible in such arrangements. In the multi-stage flash arrangements referred to, the incoming feed liquid is progressively heated, suitably by serving as the condenser coolant, as it passes through the different stages proceeding from the coolest to the hottest in indirect heat transfer with the vapor produced in the associated flash chambers. The feed is then heated in the brine heater to a temperature typically 20 or 25° above that at which it exits the condenser tubes of the hottest stage. This heated feed is again passed through the various stages although this time it is flashed to produce vapor as it proceeds from the hottest to the coolest stages.

As another example of further concentrate treatment, it can be passed through a cooling tower and the air-vapor tower discharge passed to the condensation chamber, typically chamber 118 in FIG. 3. A gas pump can be situated in the air-vapor passage to facilitate operation of the cooling tower at a reduced pressure. Similarly, the concentrate is passed to a flash chamber maintained at a reduced pressure by a pump which discharges its compressed vapor into the condensation chamber, 18 in FIG. 1, of the improved system. The pump can be replaced by a steam ejector driven by the same steam as that used to heat the bottom of chamber 12. Such combinations of the improved system with vapor compression systems offer advantages over other arrangements featuring or including vapor compression since such offers great improvements in performance ratio (lb. condensate product/lb. steam input) over conventional vapor compression type systems. Also some of the unevaporated concentrate exiting the bottom of the evaporation chamber can be recycled as indicated at dotted line 122 in FIG. 1 to conserve heat and to further concentrate the liquid. Thus a substantial amount of the unevaporated liquid, from 50% or less, up to 90 or 95% or a little more, but not all, can be recycled through the evaporation chamber. As the portion recycled is increased the temperature of the liquid feed is increased even to levels reaching to within a few degrees, or even a fraction of a degree, of the temperature of the unevaporated liquid concentrate exiting the evaporation chamber.

In addition to recovering some of the heat value in the concentrated unevaporated liquid stream by flash evaporative techniques as described earlier, the invention also contemplates a special feed heat exchanger utilizing this heat which heat exchanger and its interrelation with the other features of the invention is now described. Referring to FIG. 6 there is shown an arrangement 10 of the type depicted in FIG. 1 together with a special heat exchanger 300 which can be employed to advantage in the practice of the invention. Referring to the illustration on purifying sea water the concentrated unevaporated liquid stream L' leaves the improved evaporator 10 at a temperature of about 208° F. Almost all this heat can be recaptured in the special heat exchanger 300 which features a plurality of heat exchanger tubes 310 through which incoming cold sea water L° at a temperature of 80° F. ascends. The L' stream at 208° F. is moved downwardly on the shell side and in heat transfer relationship with the cold sea water moving up through the tubes 310. The shell side of heat exchanger 300, however, features some sort of descending film means indicated schematically as packing 308. A vapor carrier gas G such as air is introduced into the lower portion of the shell side of heat exchanger 300. Some of the gas G can be provided from the residual gas exiting condensation chamber 18 as shown by line 43a. As the L' stream descends through the packing 308 the ascending carrier gas picks up water vapor therefrom to form a gas-vapor stream 306 which exits the upper portion of the shell side. This G'-V' stream exits at a temperature of about 203° F. and can be very usefully transported to the annular space 18 to augment the action of the G-V stream exiting the bottom of column 12 and ascending within annular space 18. Since the G-V stream 306 exiting heat exchanger 300 is at a relatively high temperature of 203° F. it is introduced at a relatively low elevation into annular space 18, it being remembered that the hottest gases are introduced at the lower portions of the condenser chambers such as annular space 18 in the FIG. 1 scheme. The temperature of the G-V stream 306 can be further increased, if desired, by compression such as by compressor C. This lowers the pressure in the shell side 310 which furthers evaporation there to provide a G-V stream 306 richer in vapor. As the incoming cold sea water moves upwardly through the tubes 310 in heat exchanger 300 it is heated to a temperature of around 160° F. thereby providing an excellent liquid feed L to the improved evaporator 10. It can be seen that not only does the heat exchanger 300 provide for indirect heat exchange between the incoming L° stream (the cold sea water stream) and the heated unevaporated L' stream exiting the improved evaporator, it facilitates evaporation by direct contact with an air stream thereby providing an additional G-V stream which is very advantageously introduced to the condensing chamber of the improved system.

Thus the invention contemplates an embodiment wherein the heated unevaporated liquid exiting the lower portions of evaporation chamber or column 12 is moved to the upper portions of a second chamber where it moves in descending film fashion in counterflow relationship with an ascending gas which removes, from the descending liquid, vapor to provide an additional carrier gas-vapor (G-V) stream which is returned to the condensing chamber 18 to condense therefrom additional vapor while providing additional heat to the streams descending within the evaporator chamber 12 of the improved evaporator. As the heated liquid in the L' stream descends in counterflow relationship with the ascending gas in the second unit it moves in heat transfer relationship with incoming relatively cool liquid which is thereby heated to provide at least a part of the liquid feed entering the top portion of the evaporation chamber 12.

Figure 7:
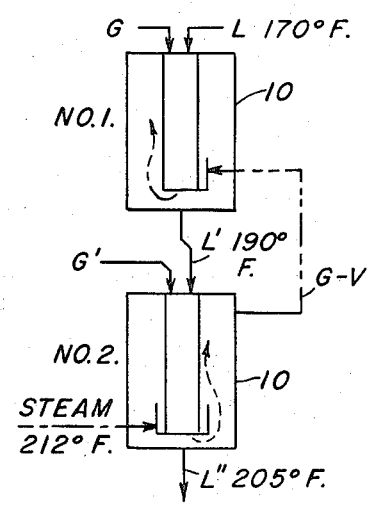
FIG. 7 is a schematic illustrating yet another embodiment utilizing the invention.

The practice of the invention also contemplates multiple staging of units of the general type shown in any of the figures previously discussed. For purposes of simplicity again reference is made to the type of arrangement depicted in FIG. 1 since it is most readily understood and highly illustrative. Referring now to FIG. 7 there is shown a two-stage unit featuring arrangements of the type generally depicted in FIG. 1. The liquid which may be sea water is shown entering the evaporation chamber of the first stage, the lower temperature stage, at a temperature of 170° F. together with the carrier gas, suitably air, at room temperature. Within this stage the liquid is heated to a temperature of 190° F. and is then passed on to the second stage, operating at a higher temperature, where it again enters the top of the evaporation chamber with a stream of room temperature carrier gas. In the second stage the liquid is heated to a temperature of about 205° F. Steam is introduced into the bottom portions of the condensation chambers in the second stage along the lines discussed in connection with FIG. 1. Some condensation occurs within the vapor chamber although the carrier gas-vapor stream, G-V, retains a considerable amount of vapor and exits the top of the second stage at a temperature of about 200° F. This permits it to substitute for live steam to heat the bottom portions of the evaporation chamber in the first stage. The effects described in connection with FIG. 1 all occur in each of the stages shown in FIG. 7. The only difference is that the residual G-V stream leaving the condensation chamber of the second stage is used to provide the heat, or at least a portion thereof, to the first stage. This reduces or eliminates introducing live steam to the first stage. This staging of units provides for increased efficiencies and economies in certain selected instances.

Still another mode of multiple stage operation of the improved system is depicted in FIG. 8 which shows three of the improved systems designated units A, B and C operated at decreasing pressures together with flash chambers to further treat the liquid concentrate leaving units A and B. The liquid feed path runs down through unit C and then enters the top of B exiting the bottom thereof and being passed through the flash chamber shown therebeneath. The unevaporated water from the unit B flash chamber is then fed to the top of the A unit and discharged to still another flash chamber. Steam at approximately 250° F. is used to heat the bottom of the evaporation chamber in unit A. The steam for the B and C stages is provided by, respectively, the A and B flash chambers as shown in FIG. 8. The flash chamber steam may be compressed as by pumps P, if desired, to increase steam temperature and enhance evaporation with the flash chambers by the maintenance therein of reduced pressures.

It is believed that a better understanding of the invention and appreciation of its advantages will evolve from the following illustrative examples. Tables I and II list the results of several runs performed with the improved evaporation system. For each example there is shown the operating conditions and the performance ratio in terms of pounds of condensate product produced per pound of steam input to the system. In the first three examples the feed was simulated sea water containing 3.5% sodium chloride. In the remaining examples the feed was tap water containing about 140 parts per million total solids. The solids content of the condensate product in all of these examples ranged from about 1 to 3 parts per million regardless of the feed. In Examples 1 to 3 a single column of the type shown in FIG. 1 was employed, the inner column 12 having a diameter of about 1¼ inches and the outer column 16 having a diameter of about 3 inches, the column being about 10 feet high and filled with ¼ to ⅜ inch gravel packing. In Examples 4 through 6 the arrangement shown in FIGS. 3 and 4 was employed. The column was about 5¾ inch by about 12 inches in cross section and about 12 feet high and included 4 sets of evaporation and 5 sets of condensation chambers. In Examples 7 through 12 two units similar to those employed in Examples 4 through 6 were arranged in multiple-stage series flow as shown in FIG. 7.

Referring now to the tables, it can be seen that the performance ratio varied from about 2 to about 4½. In considering performance ratio, it should be remembered that, as is always the case, higher performance ratios generally require higher equipment or capital costs. The performance ratio in most modestly capitalized multi-stage evaporation plants varies from around 3 to 8 and the performance ratio achieved with the present improved evaporation system compares very favorably therewith. In this connection it is again worth remembering that the present system involves substantial cost reductions in comparison with conventional multi-stage systems. In fact, as has been indicated earlier, the present system is capable of being combined with multi-stage units to improve economies. Note in Examples 6 and 7 (first stage) that the liquid inlet and outlet temperatures are substantially the same. This was effected by recycling most of the liquid concentrate as through recycle line 122 in FIG. 1. The resulting temperature profile was of the type which includes the "b" part of the curve in FIG. 1a, the cooldown (curve "b") being effected very rapidly in the uppermost portions of the evaporation chambers by the room temperature air carrier gas.

TABLE I

| Example | Feed rate, lb./hr. | Feed temp., °F. | Concentrate disch. temp., °F. | Air rate, ft.³/hr. | Steam rate, lb./hr. | Condensate rate, lb./hr. | Perf. ratio |
|---|---|---|---|---|---|---|---|
| 1 | 37 | 125 | 204 | 10 | 3.5 | 7.0 | 2.1 |
| 2 | 25 | 150 | 202 | 10 | 2.8 | 5.8 | 2.3 |
| 3 | 22 | 142 | 200 | 20 | 3.1 | 7.7 | 2.7 |
| 4 | 500 | 180 | 204 | 150 | 30.0 | 82.2 | 2.8 |
| 5 | 250 | 145 | 198 | 320 | 32.4 | 75.6 | 2.3 |
| 6 | 150 | 205 | 204 | 100 | 15.2 | 45.5 | 3.0 |

TABLE II

| Example | Feed rate, lb./hr. | Temp., °F. | | | Air rate, ft.³/hr. | | Steam rate, lb./hr. | Cond. rate, lb./hr. | Perf. ratio |
| | | L (feed) | L' | L'' | G | G' | | | |
|---|---|---|---|---|---|---|---|---|---|
| 7 | 500 | 185 | 184 | 202 | 240 | 160 | 28.0 | 97.2 | 3.47 |
| 8 | 500 | 172 | 196 | 206 | 240 | 160 | 48.7 | 173.4 | 3.56 |
| 9 | 500 | 175 | 192 | 205 | 240 | 160 | 39.5 | 143.0 | 3.63 |
| 10 | 1,390 | 161 | 175 | 206 | 708 | 360 | 98.6 | 305.1 | 3.10 |
| 11 | 500 | 178 | 190 | 204 | 240 | 160 | 25.8 | 109.1 | 4.23 |
| 12 | 350 | 163 | 191 | 207 | 354 | 288 | 53.4 | 237.1 | 4.44 |

An attempt has been made in the foregoing description to describe certain preferred embodiments of the invention. However, the invention and the claims defining such are intended to encompass all embodiments which fall under the true spirit of the invention.

What is claimed is:

1. In the method of treating a liquid feed comprising a more volatile and a less volatile fraction to separate said fractions, the steps comprising (1) moving said liquid feed downwardly in descending film fashion through a substantially vertical evaporation chamber having therewithin a substantially downwardly increasing temperature condition and moving concurrently downwardly therewith a carrier gas thereby to progressively heat said liquid and said gas media to cause evaporation of the more volatile fraction from said liquid and enrichment of said carrier gas in vapor of said more volatile fraction;

(2) moving the vapor enriched carrier gas from the exit of said evaporation chamber and upwardly through a condensation chamber and in heat transfer relationship with said evaporation chamber to progressively cool said upwardly moving vapor enriched carrier gas and condense vapor therefrom and to heat the fluid media descending within said evaporation chamber;

(3) providing heat energy additional to and at a temperature higher than the heat contained in said vapor enriched carrier gas and applying said heat energy to the bottommost portions of said evaporation chamber thereby to heat said bottommost portions of said chamber and the fluid media descending therethrough to the highest temperatures within said downwardly increasing temperature condition within said evaporation chamber;

(4) said heating of said evaporation chamber in said step 2 and said heating of the bottommost portions thereof in said step 3 providing and maintaining said substantially downwardly increasing temperature condition within said evaporation chamber, the thermal content of said vapor enriched carrier gas being utilized principally to heat upper portions of said evaporation chamber and the fluid media descending therethrough and the heating in said step 3 being utilized to heat the bottommost portions;

(5) removing said carrier gas from said condensation chamber.

2. In the method of purifying saline water, the steps comprising (1) moving said saline water downwardly in descending film fashion through a substantially vertical evaporation chamber having a substantially downwardly increasing temperature and moving concurrently downwardly therewith a carrier gas thereby to progressively heat said saline water and said gas media to cause evaporation from said saline water and enrichment of said carrier gas in water vapor from said saline water;

(2) moving the vapor enriched carrier gas from the exit of said evaporation chamber and upwardly through a condensation chamber and in heat transfer relationship with said evaporation chamber to cool said upwardly moving vapor enriched carrier gas and condense water vapor therefrom and to heat the fluid media descending within said evaporation chamber;

(3) providing heat energy additional to and at a temperature higher than the heat contained in said vapor enriched carrier gas and applying said heat energy to the bottommost portions of said evaporation chamber thereby to heat said bottommost portions of said chamber and the fluid media descending therethrough to the highest temperatures within said downwardly increasing temperature condition within said evaporation chamber;

(4) said heating of said evaporation chamber in said step 2 and said heating of the bottommost portions thereof in said step 3 providing and maintaining said substantially downwardly increasing temperature condition within said evaporation chamber, the thermal content of said vapor enriched carrier gas being utilized principally to heat upper portions of said evaporation chamber and the fluid media descending therethrough and the heating in said step 3 being utilized to heat the bottommost portions;

(5) removing said carrier gas from said condensation chamber;

(6) collecting water condensed from said vapor enriched carrier gas in said condensation chamber and removing said water as a purified product.

3. The method according to claim 1 wherein the liquid treated contains solids dissolved in a solvent which solvent comprises the more volatile fraction of said liquid.

4. The method according to claim 1 wherein the liquid treated is a saline water.

5. The method according to claim 1 wherein said heating in said step 3 is by the condensation of steam.

6. The method according to claim 5 wherein portions of the steam are commingled with the vapor enriched carrier gas above the steam introduction site and both are moved upwardly through the condensation chamber in said step 2 of said claim 1.

7. The method according to claim 5 wherein the vapor enriched carrier gas in said step 2 of said claim 1 is moved through said condensation chamber in such a manner as to exchange heat with substantially only those portions of said evaporation chamber which are above the bottommost portions thereof which are furthed heated in said step 3.

8. The method according to claim 1 wherein steam is used for said heating in said step 3 and is condensed separately from said condensation chamber of said step 2.

9. The method according to claim 1 wherein the vapor enriched carrier gas in said step 2 is moved through said condensation chamber in such a manner as to exchange heat with those portions of said evaporation chamber which are above the bottommost portions thereof which are heated in said step 3.

10. The method according to claim 1 wherein unevaporated liquid is removed from lower portions of said evaporation chamber and returned to upper portions of said evaporation chamber.

11. The method according to claim 1 wherein unevaporated liquid is removed from lower portions of said evaporation chamber and is introduced to the upper portion of another similar chamber operating at a higher temperature.

12. The method according to claim 1 wherein unevaporated liquid removed from said evaporation chamber is subjected to flash evaporation to cause additional evaporation of the more volatile fraction therefrom to produce vapor of said more volatile fraction.

13. The method according to claim 12 wherein said vapor of said more volatile fraction produced from said flash evaporation is introduced to a second condensation chamber for heating the bottommost portions of a second substantially vertical evaporation chamber maintained at a lower pressure than said evaporation chamber in said step 1 of said claim 1.

14. The method according to claim 13 wherein said vapor of said more volatile fraction is compressed before introduction for heating said second substantially vertical evaporation chamber.

15. The method according to claim 1 wherein said liquid feed in said step 1 is moved over multiplicities of film supporting surfaces situated within said evaporation chamber.

16. The method according to claim 1 wherein pluralities of said evaporation chambers and said condensation chambers are disposed in alternating heat exchange relationship.

17. The method according to claim 1 wherein the carrier gas removed from the condensation chamber is subjected to further cooling whereby further residual condensation therefrom is effected.

18. The method according to claim 1 wherein the liquid treated is introduced to said evaporation chamber at an elevated temperature which is reduced in the uppermost portions of said evaporation chamber below which is maintained said substantially continuously downwardly increasing temperature condition in said step 1 of said claim 1.

19. The method according to claim 2 wherein the vapor carrier gas is air.

20. The method according to claim 1 wherein the vapor carrier gas is recycled.

21. In the method of treating a feed liquid comprising a more volatile and a less volatile fraction to separate said fractions, the steps comprising
  (1) moving said feed liquid downwardly in descending film fashion through a substantially vertical evaporation chamber having a substantially downwardly increasing temperature and moving concurrently downwardly therewith a vapor carrier gas thereby to progressively heat said liquid and said gas media to cause evaporation of the more volatile fraction from said liquid and enrichment of said carrier gas in vapor of said more volatile fraction and to cause concentration of the less volatile fraction in the unevaporated liquid;
  (2) moving the vapor enriched carrier gas from the exit of said evaporation chamber and upwardly through a condensation chamber and in heat transfer relationship with said evaporation chamber to cool said upwardly moving vapor enriched carrier gas and condense vapor therefrom and to heat the fluid media descending within said evaporation chamber;
  (3) further heating the bottommost portions of said evaporation chamber and the fluid media descending therethrough;
  (4) said heating of said evaporation chamber in said step 2 and said step 3 providing and maintaining said substantially downwardly increasing temperature within said evaporation chamber;
  (5) collecting liquid condensed from said vapor enriched carrier gas in said condensation chamber and removing it as a concentrated liquid of said more volatile fraction in said feed liquid;
  (6) removing said carrier gas and uncondensed vapor from said condensation chamber;
  (7) moving the heated unevaporated liquid concentrated in said less volatile fraction from the exit of said evaporation chamber to the upper portions of a feed preheat chamber and passing it downwardly in descending film fashion and in counterflow relationship with a vapor carrier gas moving upwardly through said second chamber thereby to effect further evaporation of the more volatile fraction from said unevaporated liquid to enrich said vapor carrier gas with the vapor of the more volatile fraction and moving said enriched carrier gas from said preheat chamber to the condensation chamber for heating said evaporation chamber while moving through said preheat chamber in indirect heat transfer relationship with said descending unevaporated liquid and the rising vapor enriched carrier gas, cool feed liquid supply to said evaporation chamber in said step 1 thereby to preheat said cool feed liquid prior to its introduction to said evaporation chamber and to reduce the temperature of the unevaporated liquid concentrated in the less volatile fraction.

22. The method according to claim 21 wherein the vapor enriched carrier gas moving from the preheat chamber in said step 7 is compressed prior to entering the condensation chamber.

23. In a method of purifying saline water, the steps comprising
  (1) moving said saline water downwardly through a plurality of substantially vertical evaporation chambers, the saline water moving in descending film fashion concurrently downwardly with a vapor carrier gas, said chambers having substantially downwardly increasing temperatures thereby to progressively heat said saline water and said gas fluid media to cause evaporation of water vapor from said saline water and enrichment of said carrier gas in water vapor;
  (2) heating the bottommost portions of said evaporation chambers and the fluid media descending therethrough;
  (3) moving the water vapor enriched carrier gas from the bottoms of said evaporation chambers and upwardly through pluralities of condensation chambers arranged in alternating heat exchange relationship with said evaporation chambers, the vapor enriched carrier gas moving in heat transfer relationship substantially only with the portions of said evaporation chambers above said bottommost portions heated according to said step 2, thereby to heat the fluid media descending within said evaporation chambers and to cool said upwardly moving vapor enriched carrier gas to condense water therefrom;
  (4) said heating in said step 2 and in said step 3 of said evaporation chambers providing and maintaining said downwardly increasing temperatures therewithin;

(5) recovering purified water condensed in said condensation chambers and removing it as a purified water product.

24. In a system of multiple stage flash evaporation wherein a feed liquid containing solids is flash evaporated and the vapor condensed to provide a purified product and wherein the feed liquid is progressively heated by passing through a plurality of said stages in the direction of increasing temperature and then externally heated to a higher temperature prior to passing through said evaporative stages in the order of decreasing temperature and thereby flash evaporated, the improvement wherein said external heating of said feed liquid is effected by (1) moving said feed liquid downwardly in descending film fashion through a substantially vertical evaporation chamber having a substantially downwardly increasing temperature and moving concurrently downwardly with a vapor carrier gas thereby to progressively heat said feed liquid and said gas media to cause evaporation from said liquid and enrichment of said carrier gas in vapor of said liquid;

(2) moving the vapor enriched carrier gas from the exit of said evaporation chamber and upwardly through a condensation chamber and in heat transfer relationship with said evaporation chamber to cool said upwardly moving vapor enriched carrier gas and condense vapor therefrom and to heat the fluid media descending within said evaporation chamber;

(3) further heating the bottommost portions of said evaporation chamber and the fluid media descending therethrough;

(4) said heating of said evaporation chamber in said step 2 and said step 3 providing and maintaining said substantially downwardly increasing temperature within said evaporation chamber.

25. In the method of treating a liquid feed comprising a more volatile and a less volatile fraction to separate said fractions, the steps comprising (1) moving said liquid feed downwardly in descending film fashion through a substantially vertical evaporation chamber having therewithin a substantially downwardly increasing temperature condition and moving concurrently downwardly therewith a carrier gas thereby to progressively heat said liquid and said gas media to cause evaporation of the more volatile fraction from said liquid and enrichment of said carrier gas in vapor of said more volatile fraction;

(2) moving the vapor enriched carrier gas from the exit of said evaporation chamber and upwardly through a condensation chamber and in heat transfer relationship with said evaporation chamber to progressively cool said upwardly moving vapor enriched carrier gas and condense vapor therefrom and to heat the fluid media descending within said evaporation chamber;

(3) further heating the bottommost portions of said evaporation chamber and the fluid media descending therethrough to the highest temperature within said downwardly increasing temperature condition within said evaporation chamber, said further heating being effected by the action of a condensing gas provided separately from and at a temperature higher than said vapor enriched carrier gas;

(4) said heating of said evaporation chamber in said step 2 and said further heating of the bottommost portions thereof in said step 3 providing and maintaining said substantially downwardly increasing temperature condition within said evaporation chamber;

(5) removing said carrier gas from said condensation chamber.

References Cited

UNITED STATES PATENTS

| | | | |
|---|---|---|---|
| 614,776 | 11/1898 | Stocker | 203—10 |
| 3,385,768 | 5/1968 | Yost | 203—26 |
| 3,511,298 | 5/1970 | McConnel | 159—16 R |
| 3,345,272 | 10/1967 | Collins | 203—49 |
| 3,410,758 | 11/1968 | Coanda | 159—13 C |
| 3,219,553 | 11/1965 | Hughes | 203—11 |
| 2,825,680 | 3/1958 | Stutz | 202—236 |
| 3,385,770 | 5/1968 | Roe | 202—236 |
| 3,522,151 | 7/1970 | Dismore | 202—236 |

FOREIGN PATENTS

| | | | |
|---|---|---|---|
| 894,936 | 4/1962 | England | 203—10 |
| 24,930 | 12/1956 | Germany | 203—49 |
| 780,272 | 7/1957 | England | 203—49 |

NORMAN YUDKOFF, Primary Examiner

A. F. PURCELL, Assistant Examiner

U.S. Cl. X.R.

169—16, 13 C; 202—187; 203—89

UNITED STATES PATENT OFFICE
CERTIFICATE OF CORRECTION

Patent No. 3,822,192                    Dated July 2, 1974

Inventor(s) Melvin H. Brown

It is certified that error appears in the above-identified patent and that said Letters Patent are hereby corrected as shown below:

| | |
|---|---|
| Col. 3, line 16 | Change "stream" to --steam--. |
| Col. 5, line 8 | Change "constitutent" to --constituent--. |
| Col. 5, line 60 | Change "27" to --72--. |
| Col. 7, line 59 | Change "empolyed" to --employed--. |
| Col. 7, line 62 | Change "apreciated" to --appreciated--. |
| Col. 8, line 16 | Change "efficiences" to --efficiencies--. |
| Col. 12, line 30 | Change "with" to --within--. |
| Claim 7, Col. 15, line 4 | Change "furthed" to --further--. |
| Col. 17, line 40 to Col. 18, line 26 | Delete Claim 25. |

Signed and sealed this 11th day of February 1975.

(SEAL)
Attest:

RUTH C. MASON
Attesting Officer

C. MARSHALL DANN
Commissioner of Patents
and Trademarks